United States Patent [19]

Lockwood et al.

[11] 4,070,705

[45] Jan. 24, 1978

[54] SIMULATION APPARATUS

[75] Inventors: James Andre Lockwood, Columbia; Francis Arthur Charrette, Cheverly, both of Md.

[73] Assignee: The Singer Company, Binghamton, N.Y.

[21] Appl. No.: 633,943

[22] Filed: Nov. 20, 1975

[51] Int. Cl.² ............................................. G06F 11/04
[52] U.S. Cl. ..................................................... 364/200
[58] Field of Search ...................... 340/172.5; 364/200

[56] References Cited

U.S. PATENT DOCUMENTS

| | | | |
|---|---|---|---|
| 3,287,705 | 11/1966 | Rosenblatt et al. | 340/172.5 |
| 3,400,372 | 9/1968 | Beausoleil et al. | 340/172.5 |
| 3,585,599 | 6/1968 | Hitt et al. | 340/172.5 |
| 3,825,901 | 7/1974 | Golnek, Sr. et al. | 340/172.5 |

*Primary Examiner*—Gareth D. Shaw
*Assistant Examiner*—C. T. Bartz
*Attorney, Agent, or Firm*—Ronald Reichman; James C. Kesterson

[57] ABSTRACT

In building simulators for training purposes more and more of the simulation activities are being carried out by digital computers. One of the basic problems in checking out a large complex simulator system is the testing and evaluating — and, where necessary, the correction — of the computer programs in the simulation computer. As a design tool, this invention contemplates simulating that portion of the entire system which is not usually simulated and providing between the master simulation computer which is normally used in a simulator and the secondary computer which is used only in a system of this invention, an interface which permits the smooth functioning and intercommunications between the two.

6 Claims, 4 Drawing Figures

SIMULATION APPARATUS

BACKGROUND OF THE INVENTION

1. Field of the Invention

This invention relates to electronic systems and, more particularly, to systems which simulate large complex operational equipment.

A simulator which is designed for training purposes in general comprises four major components. These components are the simulation or master computer in which the portion of the system being simulated is represented in mathematical form and which utilizes input data to produce output data according to the performance of that portion of the system being simulated. A second portion of a training simulator can be called the environment. This is that area where the trainee is situated. In most training simulators the environment is made as nearly a duplicate of the actual environment in which the operator will later find himself as possible. This environment can be the cab of a railroad engine, the cockpit of an airplane, the bridge of a ship, or the control room of a power plant. Between the master computer and the environment there is usually provided some sort of interface which translates the information coming from the computer into the form to be utilized by the environment and that information coming from the environment into the form to be used by the computer. In addition to the major three components, the training simulator also includes an instructor station with suitable peripheral input and output equipment to enable an instructor to monitor the progress of the trainee and to provide initial or malfunction conditions with which the trainee must contend.

2. Description of the Prior Art

The system described above has been the typical training simulator which has been designed and constructed in the past. Most simulators today utilize digital computers which perform more and more of the representations of the portion of the system being simulated. In other words, less and less hardware is being used to simulate. Hardware is readily broken up into electrical or mechanical components, each performing its own task. Each of these components can be checked out and tested individually and separately as they are constructed to ensure proper operation of the individual hardware components. Unfortunately, the computer programs are not so easily tested or corrected. In the prior art it was quite common to copy the procedures earlier used with hardware. That is, the computer programs were broken down into individual component programs which were designed and constructed separately and individually. The individual computer programs were then checked in a house computer to see whether they, individually, performed the functions which they were supposed to perform. Once the entire program was assembled in the simulation computer, however, the entire system had to be checked all over again. Too often errors were found in addressing, in programming and routines, in the math modeling, and in the manner in which the computer output data was utilized to control the instruments in the environment.

SUMMARY OF THE INVENTION

This invention provides apparatus for testing the operation of the simulation computer programs against a simulated hardware system which responds the way the actual hardware system in the simulator would respond. The present invention provides a suitable tool to be used in the design facility and laboratory where the mathematical modeling and computer programs are designed for training simulators.

It is an object of this invention to provide a new and improved system for designing and checking computer programs.

It is another object of this invention to provide a new and improved system for permitting computers to interact with each other.

It is a further object of this invention to provide a new and improved digital system for representing normal control and indicator devices in computer storage.

It is still another object of this invention to provide a new and improved system for permitting the checking and correction of computer programs.

It is yet another object of this invention to provide a new and improved system in which digital representations of mechanical and electrical systems may be utilized and tested in a simulated actual environment.

Other objects and advantages of this invention will become apparent as the following description proceeds, which description should be considered together with the accompanying drawings.

DESCRIPTION OF A PREFERRED EMBODIMENT

Figure 1:
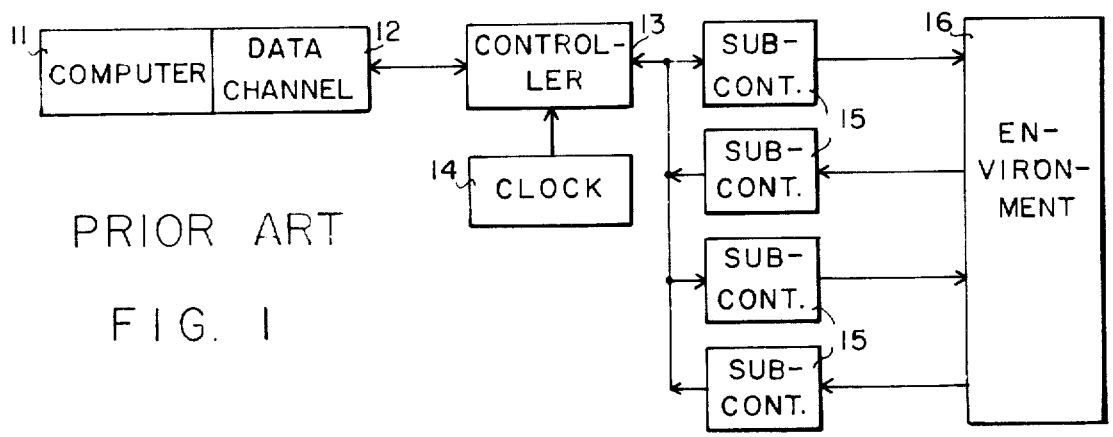
FIG. 1 is an overall block diagram of a typical prior art training simulator.

Referring now to the drawings in detail and more particularly to FIG. 1, the reference character 11 designates a general purpose digital computer having a data channel 12. The data channel 12 is connected in mutual communication with a controller 13 which is further in communication with subcontrollers 15. Also connected to the controller 13 is a clock 14, sometimes referred to as a real-time clock. The subcontrollers 15 are, in turn, connected for mutual communication with environment apparatus 16.

FIG. 1 is an overall block diagram of a typical training simulator in which mathematical representations of that portion of the system being simulated is usually stored in the computer 11 in the form of a computer program. The data channel 12 is common to many types of digital computers and is especially useful in a system of this type where there is continual communications in both directions between the computer 11 and the environment apparatus 16. At the other end of the system, the environment apparatus 16 usually comprises all of the controllers, indicators, displays, knobs, lights, switches, etc., which are found in the operator's station in the apparatus or system which is being simulated. It is generally conceded that the closer the environment apparatus 16 approaches the actual control room and control apparatus of the system being simulated, the better will be the results of the training performed on the simulator. To explain, if a pilot trainee is trained in a simulator where he is surrounded by all of the instruments, indicators, knobs and controls which he normally will find in the aircraft when he later flies it, he becomes accustomed to operating in that environment, learns where all of the controls, etc., are, and is more likely to respond correctly in an emergency situation than if that environment were not an exact duplicate of the aircraft cockpit. Thus, in general, it can be said that the environment apparatus 16 will be as close a duplicate of what the operator will find in actual use as is feasible. Connecting the computer 11 with the environment 16 is an interface which comprises a master controller 13 and a plurality of subcontrollers 15 together with a clock 14. The clock, of course, is used to provide synchronizing signals and timing signals for the overall operation of the entire apparatus.

Normally, such apparatus operates cyclically. In fact, in the systems presently being produced, communications between the computer 11 and the environment apparatus 16 is normally multiplexed. The environment 16 contains a large number of indicators which may be analog instruments of the galvanometer type, lights which can be considered Boolean in nature, switches which are Boolean controllers, and analog type controllers such as potentiometers and the like. The indicators, such as the galvanometers and the lights, receive data from the computer 11 and respond to that data, and the switches and analog controllers generate data which is then transmitted to the computer 11 which utilizes that data in its computations. Thus, there is a continual flow of a large amount of information to and from a large number of devices in the environment equipment 16 and the computer 11. For smooth operation and simplicity of construction, this data is multiplexed — that is, data from the computer to the individual indicators will be arranged in serial fashion and transmitted over a relatively small number of wires periodically in cycles. Information from the environment equipment 16 to the computer is handled in a similar fashion. The transmission and proper allocation of the information is handled by the master controller 13 and the subcontrollers 15.

Actually, when the system is designed, the computer 11 is programmed so that it recomputes during every cycle all of the information required to operate the indicators and instruments in the environment equipment 16. In order for the system to operate properly, the programming must be such that the information is ordered according to a predetermined schedule so that all information transmitted by the master controller 13 at any time is directed through the apparatus subcontrollers 15 to the indicators and instruments to which it is to be applied. The timing and addressing and the sequencing of the information is controlled by the master controller 13 together with the subcontrollers 15. The clock 14 provides the appropriate timing and sequencing signals.

Figure 2:
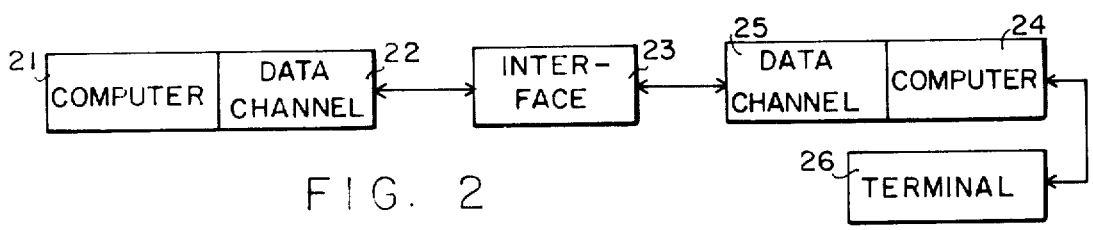
FIG. 2 is an overall block diagram of a simulated training system in accordance with this invention.

FIG. 2 illustrates in general block form a system which is analogous in operation to the system of FIG. 1 without requiring the hardware that the system of FIG. 1 utilizes. A general purpose digital computer 21 having a data channel 22 is connected to an interface 23. The interface 23 serves to connect the output from the computer 21 through a data channel 25 to a second computer 24. Computer terminal equipment 26 is connected to the second computer 24.

The computer 21 is a simulation computer which contains in mathematical form the representation of the operation of the part of the system being simulated. A data channel 22 is really part of the computer 21 and permits ready access for data to and from the computer 21. The simulation computer 21 and the data channel 22 operate in the same manner to perform the same functions as the computer 11 and data channel 12 of the system of FIG. 1. Further explanation of this operation should not be necessary at this point. The computer 24 is used instead of the environment equipment 16 of FIG. 1. The function of each of the indicators, instruments and controllers in the environment equipment 16 of FIG. 1 is simulated in the memory locations of the computer 24. This is done by assigning in the memory of computer 24 specific locations for each instrument, indicator or controller in the environment equipment 16. If the indicator is a light, which is Boolean in nature, the particular memory location assigned to that light will contain information indicating whether or not at any time that light is in the on condition or off. Similarly, when a memory location is assigned to a switch, the information contained in that memory location will indicate whether or not that switch is open or closed. The readings of the meters and the settings of the controllers are contained in the memory locations assigned to those meters and controllers. Since these settings and readings are analog in nature, they must be converted to their digital equivalents, and those equivalents are recorded in the plurality of memory locations assigned to each individual meter or controller. Since the indications, readings and settings which would normally be visible in the environment equipment 16 to an operator is, in the system of FIG. 2, recorded in the memory locations of the computer 24, the terminal 26 is provided to permit access to that information so that the information can be reproduced in visible form. Again, the data channel 25 permits ready access to the computer 24 for reading information out of that computer or for writing information into it.

The purpose of the system shown in FIG. 2 is to permit the simulation computer 21 to operate as it normally would in the complete training simulator while checking out the operation of that computer without using the actual hardware found in the environment equipment 16. The system of FIG. 2 looking out of the data channel 22 appears to the computer 21 the same as the system of FIG. 1 appears to the computer 11 looking out from the data channel 12. In order to insure that the computer 21 does not know the difference between the environment equipment 16 and the computer 24, an interface 23 is provided to assure a good match and appropriate control operators. As mentioned above, the representations of all of the instruments, indicators, and the like found in the environment equipment 16 are inserted into the memory of the computer 24. The computer 24, thereafter, substitutes for the environment equipment 16 in that it receives the appropriate data through data channel 25 and interface 23 from the computer 21, and it sends to the computer 21 the appropriate information requested by it. Therefore, the computer 21 receives updated data, performs its normal computations, and transmits through the data channel 22 the newly computed data to the computer 24. That newly computed data is stored in the appropriate locations in the memory of computer 24 just as the data would have been applied to the actual devices in the environment equipment 16. Since the computer 24 is a normal everyday general purpose computer which is readily available, and the memory in that computer may be of the plug-in type, all that is required to go from machine to machine and to test out the programs of any simulator is to plug the appropriate memory into the computer 24 and insert the appropriate programs into the computer 21. The system of FIG. 2 thereafter operates, insofar as the simulation computer is concerned, just the same as the system of FIG. 1 operates. Interface 23 is an important part of FIG. 2 and renders the entire concept feasible by permitting the two computers 21 and 24 to talk to each other without difficulty.

Figure 3:
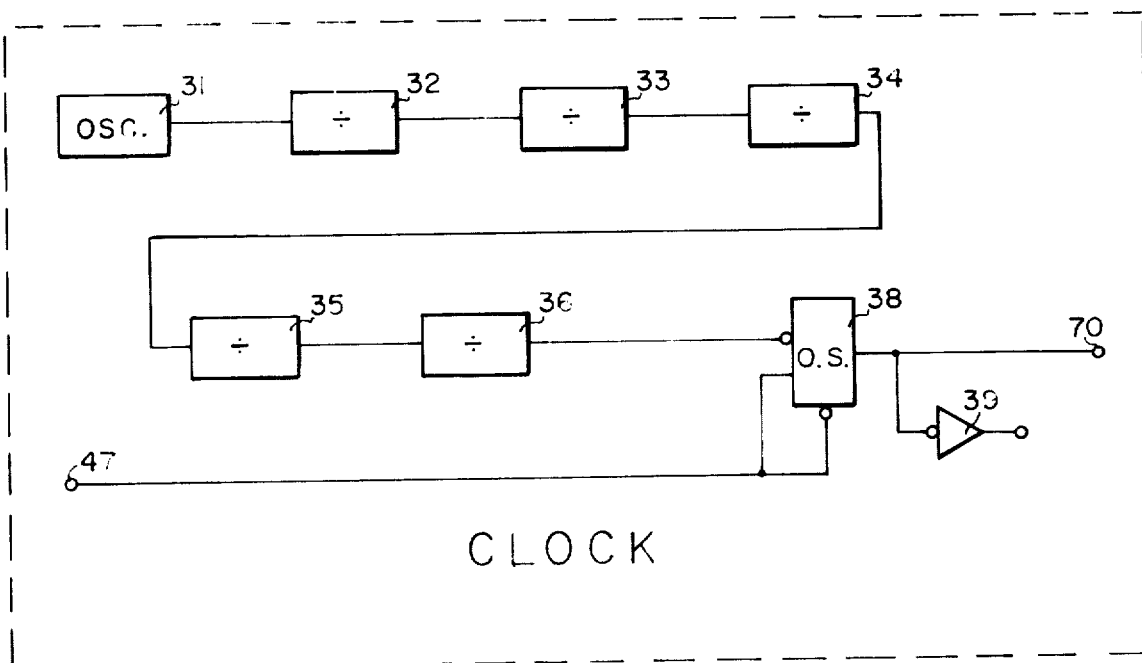
FIG. 3 is a logical block diagram of a clock suitable for the use in this invention.
Figure 4:
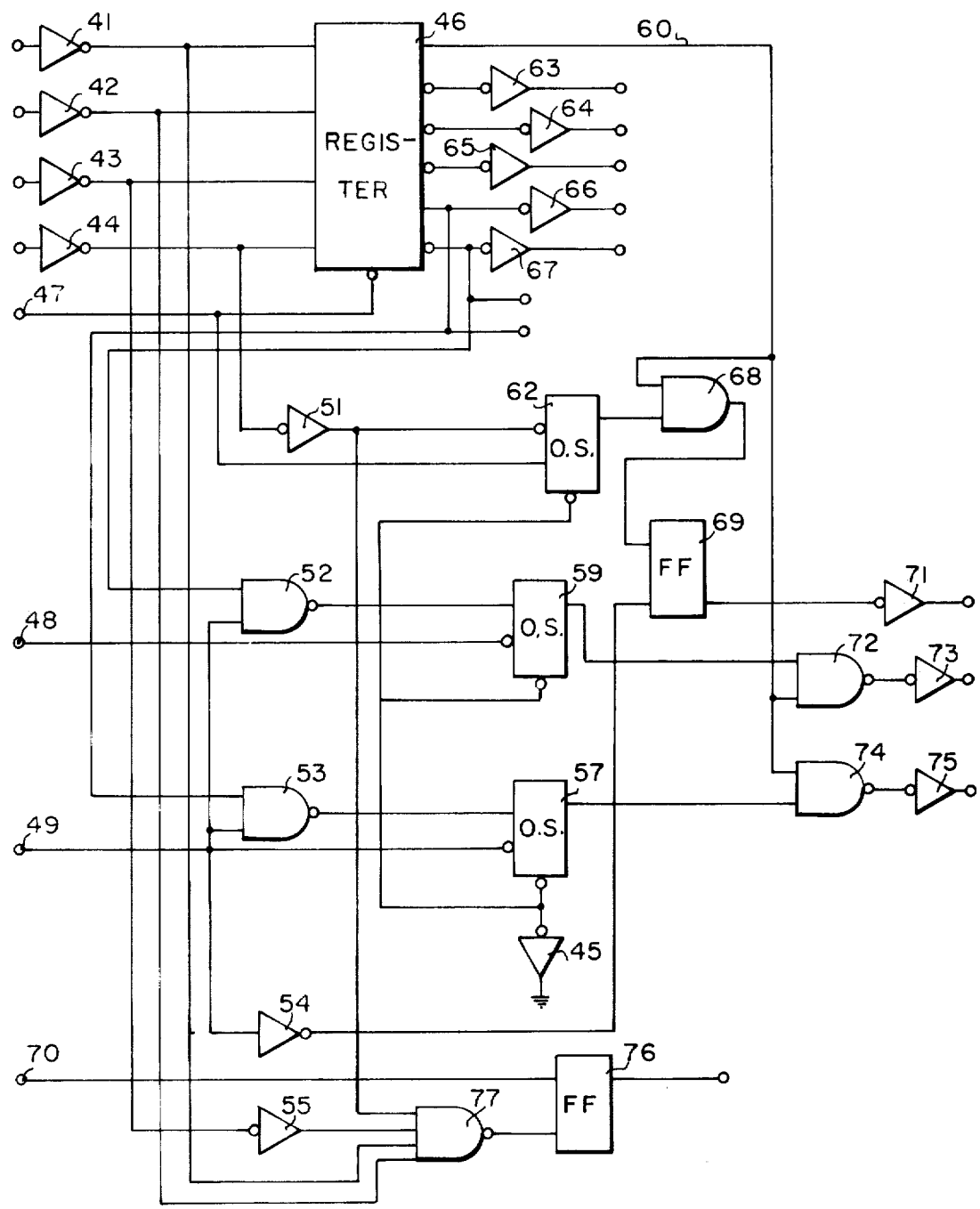
FIG. 4 is a logical block diagram of one form of the system of this invention.

FIG. 3 is a block diagram of a clock and FIG. 4 is a logical block diagram of the interface 23 of FIG. 2, and FIGS. 3 and 4 will be considered together. A clock 14 comprises an oscillator 31, which may be a free-running multivibrator, and a plurality of frequency dividers 32, 33, 34, 35 and 36 connected in sequence to the output of the oscillator 31. The output from the divider 36 is applied to one input of a one-shot 38. The restore output from the one-shot 38 is applied directly to the set input of a flip-flop 76, and through an inverter 39 to the computer 21. A second input to the one-shot 38 is a clear signal which comes along line 47 from the computer 21 and which is applied to the clear inputs of a register 46 and the one-shot 38. The set output from the flip-flop 76 is a high status signal which is applied back to the computer 21. The register 46 receives four inputs from inverters 41, 42, 43 and 44 and has six outputs, five of which are applied to inverters 63, 64, 65, 66 and 67 and the sixth of which is applied along a line 60 to one input of an AND gate 68 and also to one input of a NAND gate 74. The inputs to the inverters 41, 42, 43 and 44 are signals from the computer 21. Three of these signals applied to inverters 41–43 are coded function signals, and the fourth applied to the inverter 44, is an enable strobe signal. The output from the inverters 41–43 are also applied as inputs to a NAND gate 77, the output from the inverter 43 being applied through a second inverter 55. The output from the inverter 44 is also applied through a second inverter 51 as one input to the gate 77 and also as one input to a one-shot 62 whose set output is applied as a second input to the gate 68. The output from the gate 68 is applied to the set input of a flip-flop 69 whose restore output is applied through an inverter 71 to the computer 24. The clear signal along line 47 is applied as the second input to the gate 61. The output from the gate 77 applies a restore signal to the flip-flop 76. A cycle-end input from the computer 21 is applied to line 48 and serves as one input to one-shot 59. Similarly, a cycle-end signal from the computer 24 is applied along a line 49 to one input of a one-shot 57, also as one input to each of NAND gates 52 and 53, and also through an inverter 54 to the restore input of flip-flop 69. The fifth output from the register 46 is applied as an out signal to the computer 21 through inverter 66 and also as a second input signal to the gate 53 whose output is applied as a second signal to the input of the one-shot 57. The output from the one-shot 57 is applied as a second signal to the gate 74, whose output through an inverter 75 becomes the cycle request signal applied to the computer 21. The sixth output from the register 46 is applied as an in signal to the computer 21, and through inverter 67 to the input of computer 24, and also as a second input to the gate 52, whose output is the second input to the one-shot 59. The output from the one-shot 59 is applied as the second input to the gate 72, the output of which is applied through an inverter 73 to become the cycle request signal to the computer 24.

In the normal operation of the simulator shown in FIG. 1, the information contained in the computer 11 is repeatedly corrected. This is called "up-dating." Since what is being simulated is usually a complex system, as the system operations the conditions and values of various parameters throughout the system change. It is these changes which are introduced into the computer 11. The computer 11 utilizes the new information to recalculate its outputs which are then transmitted to the instruments, indicators and the like in the environment 16. Normally, changes in the indicators and instruments in the environment 16 cause the trainee to effect additional changes in the controls which result in changed information being applied back to the computer 11. In the system of FIG. 2, the operation is essentially the same as that of FIG. 1 except that there is no trainee present. As the system being simulated by the two computers 21 and 24 operates, conditions and parameters of the system change, producing changes in the outputs of the two computers 24 and 21. These changed values are periodically applied to the two computers to supply changed values.

During such operation of the system shown in FIG. 2, the operation of the computer 21 is periodically interrupted for up-dating. The oscillator 31 generates output pulses at a selected rate. A suitable rate would be in the neighborhood of 4 mHz. The frequency of the output from the oscillator 31 is reduced by each of the frequency dividers 32–36 so that an output from the one-shot 38 appears once every tenth of a second (100 msec.). This output is applied to the set input of the flip-flop 76 causing that flip-flop to generate an output signal. At the same time the output from the one-shot 38 is applied through the inverter 39 to obtain the proper polarity signal, and this is applied to the computer 21 to interrupt that computer. When the computer 21 receives the interrupt signal from the clock 14, it checks to see what caused the interrupt — for what purpose was the interrupt. In checking, it checks to see whether or not the output from the flip-flop 76 is high or low. As stated above, the output from the flip-flop 76 is high and this indicates to the computer 21 that the interrupt was a clock interrupt and that the time has come to up-date the information. Computer 21 then determines which data will be transferred first. To accomplish this, it generates a combination of three code signals which are applied to the inputs of the inverters 41, 42 and 43. A fourth signal applied to the input of inverter 44 is an enable signal which strobes register 46, gate 77 and one-shot 62. The combination of pulses applied to the inputs of the inverters 41–43 determines whether or not the information being transmitted will be analog information from the computer 21, digital information from the computer 21, analog information from the computer 24, or digital information from the computer 24. This is the normal operation of the computer 21 as it would operate with the system of FIG. 1. In other words, in the system of FIG. 1 the computer 11 signals to the controller 13 what the data transfer operation is at any instant. This code output from the computer is not changed in the system of FIG. 2. These input signals are applied to the register 46 and to the gate 77. Since all of the signals are applied to the gate 77, the output of that gate is applied to the restore input of the flip-flop 76 to restore that flip-flop and remove the status signal from the computer 21. The register 46 applies three output signals through inverters 63, 64 and 65 carrying the same combination of signals as was applied from the computer 21 to the input of the computer 24 to indicate to that computer what action is to take place. Computer 24 is thereby conditioned to operate in accordance with the selected transfer function. In addition, when an output from the register 46 is applied to the inverter 63, a signal is also applied to line 60 which applies an enable input signal to the gates 69, 72 and 74. The input to the inverter 63 and the signal on line 60 are the complements of each other. The inputs to the inverters 66 and 67 and also complementary signals so that when one is high, the other is low. Thus, one input will set up computer 21 for output operation and computer 24 for input operation, and the other input will set up computer 21 for input operation and computer 24 for output operation.

To review the operation, it must be assumed that the simulator is operating normally. This means that the information contained in computer 21 is periodically updated. One sample period for such up-date is 100 milliseconds. Each 100 milliseconds the clock 14 generates an output signal which is applied to the input of the flip-flop 76 to set that flip-flop and generate the status signal for computer 21. That output from the clock 14 is also applied through an inverter 39 to the computer 21 to interrupt that computer. When the computer 21 receives the interrupt signal, it queries its status inputs to determine where the interrupt originated. The fact that the output from the flip-flop 76 is high indicates to the computer 21 that the interrupt was a clock interrupt. This means that it is time to transmit information between computer 21 and computer 24. In each of the data channels 22 and 25 there exists an encoding and a decoding circuit. The encoding circuit generates a three-bit code which indicates to the decoding circuit in the other computer what type of information is being transferred. As mentioned above, the information can be input information to the computer 21 or output information from the computer 21. In addition, for each type of input or output information, the information can be either digital or analog. Therefore, a three-bit code is used to indicate what type of transfer is to take place. The clock 14, having interrupted computer 21 and indicated to computer 21 that a data transmission is to take place, does nothing more until the next time for recycling arrives. Computer 21 has its programs so organized that it follows a standard procedure for up-dating information. The particular procedure followed is not of importance here and will not be discussed in detail. However, the code generated in the data channel 22 is transmitted to the interface 23 and, therethrough, to the computer 24. The interface 23 utilizes that code to generate suitable control signals for the computer 24 so that the proper transfer of information can be achieved. When an information transmission cycle has been completed, end of cycle signals are generated by the interface 23 to signal to the computers 21 and 24 that they may start another transmission cycle.

The above specification has described a new and improved system for interconnecting two computers which together simulate an entire system. It is realized that a reading of the above description may indicate to others skilled in the art additional ways in which the principles of this invention may be utilized without departing from its spirit. It is, therefore, intended that this invention be limited only by the scope of the following claims.

What is claimed is:

1. A system for interconnecting an environmental computer and a simulation computer in a master-slave relation, in order to permit said environmental computer to check the simulation programs contained in said simulation computer permitting computer simulation of the operational equipment program contained in said environmental computer that comprises a portion of a training simulator, said system comprising:

a simulation computer having a first memory for storing in the form of a computer program that portion of the system currently being simulated, a first central processing unit for exercising said computer program, and a first communications unit;

an environmental computer having a second memory, a second central processing unit for exercising said computer program, and a second communications unit, said second communications unit being coupled to and in communication with said first communications unit; and said second communications unit also being coupled to said second central processing unit;

said simulation computer being able to carry out a series of mathematical relationships to achieve specified continuous results requiring repeated updating of data;

said second memory being divided into a plurality of separate addresses with each address being assigned to represent a specific item or condition of said system;

said second central processing unit being coupled to said second memory and being able to read information into and out of said second memory;

an interface connecting said first and second memories in mutual communication;

a clock in said interface, which clock periodically generates an output pulse for the periodic updating of communications establishing the time for beginning communications between said simulation and environmental computers so that said simulation computer may update said environmental computer with data;

means for applying said clock pulse to said first communications unit to interrupt the normal operation of said simulation computer;

a bistable means in said interface connected to the output from said clock to be set by said clock pulse and used for storing the indication of said interrupt, means for connecting the set output of said bistable means to said first communications unit to signal to said simulation computer that the interruption of its normal operation was from said clock for the purpose of transferring information;

a code generating means in said first communications unit responsive to and connected to said interrupt which is caused by said clock pulse and said set output being connected to said code generating means to generate a digital code representative of the type of communications to be established between said simulation and environmental computers and said interface;

said interface further including a register coupled to said code generating means for storing said digital code generated by said code generating means;

means for applying said code to the input of said register;

a decoder in said second communications unit whose output is coupled to said environmental computer;

means for connecting the output of said register to the input of said decoder so that said environmental computer reads the code decoded by said decoder and is able to communicate and receive information from said simulation computer via said first communications unit, permitting information to be transferred from said interface and said second communications unit so that said items or said conditions being stored in said second memory may be checked;

means in said interface coupled to said first and second communications units and connected to and responsive to said code for resetting said bistable means; and said means being connected to and responsive to the generation of an end of cycle signal that is produced by said interrupt of said simulation computer so that said interface means will generate a signal for said environmental computer so that said environmental computer may be updated with data in order to simulate the instruments and indicators that comprise said operational equipment upon receipt of said data by said environmental computer, said environmental computer generating an end of cycle signal to said simulation computer to inform said simulation computer if additional data is available.

2. The system defined in claim 1 further including a second bistable device coupled to said second communications unit and said register for generating a first output signal which is coupled to said second communications unit alerting said environmental computer to the establishment of communications between said simulation and environmental computers, said second bistable means being responsive to the transfer of the code combination generated by said code generating means into said register to generate a second output signal to said simulation computer.

3. A system for interconnecting two digital computers in a master-slave relation wherein a master computer containing a first communications unit that is able to perform a series of mathematical processes continuously to produce continually updated results and a slave computer containing a second communications unit and including an information memory comprising a plurality of separate addresses which are individually assigned to represent the status of a particular item or condition of an indicator or switch, each of said items or conditions being changed as said system operates, said system comprising:

an interface connecting said first and second communications units in mutual communication with each other;

said interface comprising a clock which generates an output interrupt signal for the periodic updating of communications;

means for connecting said interrupt signal from said interface to said first communications unit;

a first bistable device contained within said interface;

means for connecting said interrupt signal to said first bistable device to set said first device, said first device being reset by said master computer;

means for connecting the set output of said first bistable device to said first communications unit to indicate the purpose of said interrupt signal;

said master computer in response to said set output and said interrupt signal generating a code combination indicative of the nature, direction and content of the communications to be established between said master and said slave computers, and means responsive to and connected to said code combination and coupled to said master computer and said slave computer for alerting said slave computer to the communication.

4. The system defined in claim 3 wherein said means responsive to the code combination includes at least a second bistable device; and means for applying to the set input of said second device a pulse generated by a portion of said code combination which was previously established by the software in said master computer, and means for connecting the set output of said second device to said slave computer to alert said slave computer to a forthcoming transfer of information between said computers.

5. The system defined in claim 4 wherein said means responsive to the code combination is coupled to said master computer and said slave computer and includes at least a register coupled to said code combination for receiving at its inputs said code combination, and means coupled to said register for applying the outputs of said register to said slave computer to indicate to the slave computer the type of communication being established by said master computer.

6. The system defined in claim 5 further including means responsive to at least a portion of said code combination for generating a signal resetting said first bistable device.

* * * * *